United States Patent Office 3,245,940
Patented Apr. 12, 1966

3,245,940
FIRE RETARDANT EPOXY RESINS WITH ESTERS OF ORTHOPHOSPHORIC OR PYROPHOSPHORIC ACID AND AN EPOXIDE
Thomas E. Ronay, Oak Park, and Robert D. Dexheimer, Naperville, Ill., assignors to The Richardson Company, Melrose Park, Ill., a corporation of Ohio
No Drawing. Filed Sept. 13, 1961, Ser. No. 137,725
8 Claims. (Cl. 260—30.6)

This invention relates to modified epoxy resins and, more particularly, to epoxy resins having improved flame retardant properties.

Because of their unique properties, epoxy resins have acquired wide acceptance in the field of molded products, coatings and the like. Such resins have shown considerable promise, for example, in preparing insulation media for use in electrical equipment. Due to compactness of electrical components resulting from miniaturization as well as higher voltages frequently employed, more stringent properties are continually being required of resin systems for use in applications of the foregoing type. One of the important properties desired for resin systems employed for insulation media is that of its ability to resist flame propagation, sometimes referred to as "flame retardance."

Numerous additives of one type or another have been developed for use with resin systems to improve their flame retardant characteristics. Among the more well-known additives for various resin systems are polyvinyl chloride, chlorinated biphenyl, chlorinated paraffin wax and tricresyl phosphate. Frequently, antimony trioxide is also used in combination with the foregoing additives.

In general, most of the flame retardant adidtives for resin systems are combined with such systems as physical mixtures and are not chemically bound with the basic resin. Additives of this type are sometimes removable if subjected to common solvents. Also, many flame retardant additives are relatively expensive, whereby their use in combination with various resin systems results in an appreciable increase in costs. Certain flame retardants, such as tricresyl phosphate, frequently will be found to lower the physical and/or mechanical properties, e.g., the heat distortion point of a particular resin system with which they may be used.

It is one of the primary objects of this invention to provide an epoxy resin having improved flame retardancy properties.

Another object is to provide a flame retardant for epoxy resins which is chemically bound into the resin as an integral part thereof.

A further object is to provide a flame retardant for epoxy resins which is relatively inexpensive and which does not detract from the properties characteristic of such resins.

These and other objects are accomplished by incorporating in and reacting with the epoxy resin esters of certain phosphoric acids, more particularly, olefin oxide esters of orthophosphoric acid and pyrophosphoric acid. Orthophosphoric acid may be represented structurally by the formula:

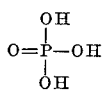

whereas, pyrophosphoric acid may be represented structurally by the formula:

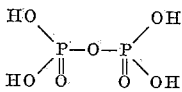

The foregoing phosphoric acids, as indicated, may be esterified by reaction with olefin oxides exemplified by alkylene oxides, such as ethylene oxide, propylene oxide, 1,2-butylene oxide, 1,2-acetylene oxide and diglycidyl ether or chlorinated derivates, for example, epichlorohydrin. The esterified reaction product is usually a water-white substantially water-insoluble compound. The particular type of esters contemplated as flame retardant additives are those which are formed by reacting sufficient olefin oxide with the phosphoric acid which will esterify all of the hydroxyl groups attached to the phosphorous atom.

Reaction of an olefin oxide with a phosphoric acid of the above type proceeds initially with the hydroxyl groups of the phosphoric acid until all of the hydroxyl groups attached to the phosphorous atom are esterified. The resulting adducts are tris-betahydroxy phosphate esters. The beta hydroxyl groups formed by the initial reaction may be further reacted or adducted with additional olefin oxide monomer, such that polymeric or chain type compounds may be formed at each hydroxyl position of the original phosphoric acid. Based on orthophosphoric acid and pyrophosphoric acid as alternate starting compounds, the present invention contemplates, as a flame retardant additive, an ester of a phosphoric acid understood to have the following respective structures

and

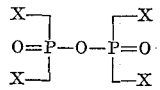

where X represents

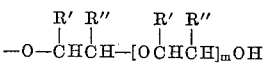

and wherein R' and R" are selected from the group consisting of hydrogen, alkyl and cyclic akyl radicals, and their halogen substituted derivatives, and $m$ is a number from 1–3. Certain analogous aryl compounds, such as styrene oxide, when reacted with phosphoric acid result in esters which have unsaturation as disclosed and claimed in the copending application of Ronay et al., Serial No. 137,736, filed September 13, 1961, now Patent No. 3,112,335.

Compounds of the foregoing type have been disclosed to some extent in the patent to Adams et al., 2,372,244. Example I of this patent presents a method for preparing a phosphoric acid ester as contemplated herein by reacting propylene oxide with orthophosphoric acid. The resultant ester is of the type wherein $m$ in the above formula is 1.

The reaction of olefin oxides with ortho or pyrophosphoric acids proceeds readily without a catalyst and may be easily controlled so as to obtain a phosphoric acid ester having the desired chain length at each hydroxyl position of the original phosphoric acid. Temperatures within a range of 0° F. to 300° F. and at sufficient pressures to maintain reactants in liquid phase may be used in producing the esters. The lower molecular weight alkylene oxide derivatives, such as ethylene or propylene oxide derivatives, are more water-soluble than the higher alkylene or aromatic oxide derivatives. Plasticization of epoxy resins may be obtained with esters which are characterized by longer type chains wherein $m$ in the above formula is of the order of 3, for example. However, in general, the longer the chain, the less flame retardancy properties are obtained. Flame retardancy is due principally to the presence of phosphorous in the ester and its influence on flame retardancy is substantially proportional to the extent, percentagewise, of its presence in the ester. Phosphate esters wherein $m$ is 0 in the above formula are less hydrolytically stable as compared to those esters wherein $m$ is 1 or more. Hydrolytical stability is of particular importance in the use of the present flame retardant agents with epoxy resins for electrical or electronic applications. Thus, it is preferable to have a chain length of from 1 to 3 epoxide monomer units per acid functionality.

In addition to their primary use as flame retardants, the phosphoric acid esters contemplated have been found to enhance the cure of epoxy resins and, particularly an epoxy resin cure wherein an acid or an acid anhydride curing agent is employed. This additional advantage is considered to be due to the fact that the residual hydroxyl groups present in the phosphoric acid esters contain an active hydrogen, which reacts with the epoxy groups of the resin, thereby enabling chemical reaction with the resin and also serving as a promoter for the anhydride type curing system.

The phosphoric acid esters of this invention may be used with a wide variety of polyepoxide resins or resin-forming systems. Polyepoxides are characterized by the presence of a plurality of epoxy groups

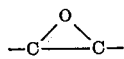

sometimes referred to as "oxirane groups." Polyepoxides may be aliphatic, aromatic, cycloaliphatic or heterocyclic and may contain substituents, such as hydroxyl groups or halogen atoms, etc. Many epoxies currently in use are polyglycidyl ethers obtained by the reaction of epichlorohydrin or dichlorohydrin with a polyhydric compound in the presence of an alkaline medium. These polyhydric compounds may be polyhydric alcohols or polyhydric phenols. Polyhydric alcohols, which may be reacted with epichlorohydrin, for example, to produce polyglycidyl ethers are exemplified by glycerol, propylene glycol, butylene glycol, sorbitol, mannitol and the like. Polyhydric phenols are exemplified by phenol, resorcinol and bisphenols, such as 2,2-bis(4-hydroxyphenyl)propane. Additionally, epoxylated novolaks have gained some acceptance, these compounds being obtainable by reacting epichlorohydrin in an alkaline medium with fusible phenol-formaldehyde condensation products.

Additional polyepoxides capable of being cured to a hard infusible state are those obtained through the peracetic acid route and are exemplified by dicyclopentadiene diepoxide and epoxidized triglycerides, such as epoxidized soybean oil.

For further disclosure of the various types of epoxy resin or resin-forming compounds which may be used in combination with the present flame retardants, reference is made to numerous examples referred to in the patents to Shokal 2,915,485 and Schroeder 2,903,381. Additionally, the publication by Lee and Neville, "Epoxy Resins," 1959, also may be referred to for a disclosure of various epoxy resins which may be employed and processes for making the same.

In some instances wherein even higher flame retardant properties are desired, the phosphoric acid esters contemplated may be reacted with additional compounds having flame retardant properties, such as chlorendic anhydride, prior to introducing the thus modified ester into the epoxy resin. Chlorendic anhydride contains a relatively high percentage of chlorine atoms, which thereby further enhances flame retardant properties of the ester and, correspondingly, the epoxy resin.

The phosphoric acid esters may be and preferably are added to an epoxy resin composition prior to adding the curing agent. In general, the usual curing agents for epoxy resins, such as amines and anhydrides, are maintained separately until curing of the epoxy resin is desired, whereupon the curing agent is added with the cross-linking reaction proceeding immediately. Under influence of the curing agent, the resins normally cure to a hard, infusible state. Exemplary curing agents are disclosed in the aforementioned patents to Shokal and Schroeder, as well as in the publication by Lee and Neville.

Epoxy resins containing flame retarding components of the type contemplated herein may be used for the production of a variety of molded and laminated products as well as for coatings. Such resin systems have found particular utility in the production of synthetic laminates used as insulation media, such as supporting boards for printed circuits or electrical circuit components or as insulation between terminals or elements of switch gears, relays and the like.

Synthetic laminates are normally made by impregnating a fibrous filler, such as paper, canvas, duck, etc. with a varnish containing an epoxy resin composition followed by superimposing a plurality of the impregnated filler sheets and consolidating the assembly by heat and pressure by use of heated platens. Solvents employed to make an epoxy resin varnish for laminating are exemplified by methyl ethyl ketone and toluene. Disclosure of techniques for making synthetic laminates generally may be found in the publication "Laminated Plastics"—Duffin, copyright 1958.

The phosphoric acid ester flame retardants of this invention are preferably employed in combination with epoxy resins within the range of between about 1–15% by weight of phosphoric acid ester to epoxy resin. This range enables maximum utilization of the flame retardant properties of the phosphate ester while maintaining the normal physical and electrical properties characteristic of epoxy resin systems.

As indicative of flame retardant properties and other pertinent properties obtainable with the phosphoric acid esters contemplated in combination with epoxy resins, the following table is presented of data obtained from test bars. Included in the table are data obtained on test bars made for control and comparison purposes from epoxy resins without a flame retardant additive and using tricresyl phosphate (TCP) as the flame retardant additive. The epoxy resin used in the samples was Epon 828 sold by Shell Chemical Company, obtained by reaction, in an alkali medium, of epichlorohydrin and bisphenol-A and having an epoxy equivalency of 190. As a curing agent for the epoxy resin, diethylentriamine was used. Further, in order to standardize conditions, each sample was prepared using 50 grams of epoxy resin and 5.4 grams of the curing agent, a cure time of 16 hours and a cure temperature of 25° C.

| Flame Retardant | | Casting Hardness (Barcol) | Percent Phosphorous | Percent Chlorine | Burn Test Secs. |
| --- | --- | --- | --- | --- | --- |
| Type | Grams | | | | |
| (1) | | | 15 | 0 | 0 | 45 |
| (2) | TCP | 13.0 | 10 | 1.6 | 0 | 0/0/4 |
| (3) | A | 20 | 0 | 1.8 | 0 | 0/15/1 |
| (4) | B | 9.1 | 23.0 | .8 | 4.3 | 0/0/1 |
| (5) | C | 13.0 | 32.0 | 1.5 | 0 | 0/0/1 |

Flame retardant A was derived from pyrophosphoric acid containing 79.8% $P_2O_5$ and propylene oxide, wherein each ester chain attached to phosphorus contained an average of 3.2 propylene oxide derivative units. The specific gravity of the ester at 25° C. was 1.104 and the ester contained 5.5% phosphorus.

Flame retardant B was derived from pyrophosphoric acid containing 81.0% $P_2O_5$ and epichlorohydrin, wherein each ester chain attached to phosphorus contained an average of 2.2 oxide derivative units. The specific gravity of the ester at 25° C. was 1.426 and the ester contained 30.9% chlorine and 5.0% phosphorus.

Flame retardant C was derived from a pyrophosphoric acid containing 81.0% $P_2O_5$ and butylene oxide wherein each ester chain contained an average of 2.2 butylene oxide derivative units. The specific gravity of the ester at 25° C. was 1.103 and the ester contained 5.7% phosphorus.

In conducting the burn test, a solid sample, approximately 1/4" thick, is clamped in a vertical position about 2" higher than the top of a Tirrill burner. The burner flame is adjusted to give a 1" cone. The flame is applied to the edge of the test piece for 5 seconds and withdrawn. The number of seconds the piece burns after the flame is withdrawn is recorded and the flame reapplied. This is repeated until the piece does not self-extinguish in 45 seconds or until it has passed 3 cycles. The results are reported, for example, as 3/18/45+ meaning a 3 second burn for the first cycle, 18 seconds for the second cycle and not self-extinguishing on the third cycle.

For purposes of further indicating the advantages of the flame retardant agents contemplated, the following additional examples are presented illustrating their effect when using an anhydride-type curing agent for epoxy resin Epon 828, in particular Methyl Nadic, a liquid anhydride having a molecular weight of 178.2, available from National Aniline Division of Allied Chemical and Dye Corportion and further described in their Technical Data Bulletin 61559. In each of the additional examples, 22 grams of curing agent were used per 50 grams of resin and the cure time was standardized at 18 hours.

|  | Flame Retardant | | Casting Hardness (Barcol) | Percent Phosphorous | Percent Chlorine | Burn Test Secs. |
|---|---|---|---|---|---|---|
|  | Type | Grams | | | | |
| (6) | | | (¹) | | | |
| (7) | TCP | 22 | (¹) | | | |
| (8) | B | 22 | 0 | 0.8 | 4.3 | 5/5/4 |

¹ No cure.

Zero cure in Example 8 indicates that a solid was formed but was not sufficiently hard to obtain a reading. As demonstrated by the above data, the present flame retardants promote an epoxy cure with an anhydride agent.

In making a glass cloth based epoxy resin laminate, a typical varnish formula comprises the following components:

|  | Parts/Wt. | Percent |
|---|---|---|
| Epi Res | 50 | 45.7 |
| Epon 1004 | 50 | 45.7 |
| Metaphenylene diamine (catalyst) | 8.4 | 7.8 |
| DMP-30 Accelerator | 0.66 | 0.8 |

Epi Res 510 is available from Jones Dabney and is a liquid glycidyl ether of bisphenol-A and epichlorohydrin. Epon 1004 is a solid glycidyl ether of bisphenol-A and epichlorohydrin also containing hydroxyl groups and is available from Shell Chemical Company. DMP-30 is a tertiary amine supplied by Rohm and Haas. The varnish includes as the solvent sufficient 1:1 blend of methyl ethyl ketone and toluene to give a specific gravity of about 1.020.

In impregnating the glass cloth filler, such as Hess Goldsmith Style HG–28-Volan "A" finish, the filler is passed through a bath of the varnish initially followed by subjecting the impregnated filler to drying. The dried impregnated filler normally will have a resin content of between approximately 34 to 36 percent and about 0.20 volatiles. A plurality of impregnated and dried sheets are assembled and subjected to a pressure of 1200 p.s.i. for two hours at 336° F. The resulting laminate will meet all tests required by military specification M.1 P–18177B for type GEE, however, it will not pass the first cycle for flame retardance required by Mil P–13949B. When ten percent by weight of compound "B" identified hereinabove is added to the impregnating varnish, the same laminate will pass the first cycle required by the above M.1 specification and will burn for only two seconds on the second cycle.

Having described the invention and certain exemplary embodiments thereof, the same is only intended to be limited by the scope of the following claims.

We claim:
1. A hard infusible resinous product characterized by enhanced flame resistance comprising the reaction product of a polyglycidyl ether, a curing agent for said ether selected from the class consisting of amines, polycarboxylic acids, and acid anhydrides and between about 1 to 15 percent by weight of said ether of the reaction product of orthophosphoric acid and an alkylene oxide in the molar ratio range of approximately 1:3 to 1:9.

2. A resinous product as described in claim 1 wherein said ether is derived from a polyhydroxyl phenol.

3. A hard infusible resinous product characterized by enhanced flame resistance comprising the reaction product of a polyglycidyl ether, a curing agent for said ether selected from the class consisting of amines, polycarboxylic acids, and acid anhydrides and between about 1 to 15 percent by weight of said ether of the reaction product of pyrophosphoric acid and an alkylene oxide in the molar ratio of approximately 1:4 to 1:12.

4. A resinous product as described in claim 3 wherein said ether is derived from a polyhydroxyl phenol.

5. A composition comprising the product of the reaction of (a) an epoxylated resin characterized by the presence of a plurality of oxirane groups, (b) a curing agent selected from the class consisting of amines, polycarboxylic acids, and acid anhydrides and (c) between about 1–15 percent by weight of said epoxylated resin of the reaction product of a member of the class consisting of an alkylene oxide and its halogen substituted derivatives with a member of the class consisting of orthophosphoric acid and pyrophosphoric acid in the molar ratio range of approximately 3:1 to 9:1.

6. A composition as described in claim 5 wherein the epoxylated resin is a polyglycidyl ether of a polyhydroxyl phenol.

7. Synthetic insulation media having enhanced flame resistance comprising a fibrous reinforcing filler and a hard infusible composition comprising the product of the reaction of (a) an epoxylated resin characterized by the presence of a plurality of oxirane groups, (b) a curing agent for said resin selected from the group consisting of amines, polycarboxylic acids and acid anhydrides and (c) between 1–15 percent by weight of said epoxylated resin of the reaction product of a member of the class consisting of an alkylene oxide and its halogen substituted derivatives with a member of the class consisting of orthophosphoric acid and pyrophosphoric acid in the molar ratio range of approximately 3:1 to 9:1.

8. Synthetic insulation media as described in claim 7 wherein said fibrous filler comprises a plurality of superimposed fibrous lamina.

(References on following page)

References Cited by the Examiner

UNITED STATES PATENTS

| | | |
|---|---|---|
| 2,568,784 | 9/1951 | Woodstock. |
| 2,686,711 | 8/1954 | Whitehill et al. |
| 2,732,367 | 1/1956 | Shokal. |
| 2,849,418 | 8/1958 | Fang. |
| 2,909,559 | 10/1959 | Lanham _____ 260—461.312 |
| 2,956,037 | 10/1960 | Venable _____ 260—2.5 XR |
| 2,992,196 | 7/1961 | Ilardo et al. |
| 3,061,625 | 10/1962 | Friedman _____ 260—30.6 |
| 3,099,676 | 7/1963 | Lanham _____ 260—30.6 |

FOREIGN PATENTS 869,969  6/1961  Great Britain.

ALLAN LIEBERMAN, *Acting Primary Examiner.*

MILTON STERMAN, MORRIS LIEBMAN,
*Examiners.*

T. D. KERWIN, A. H. KOECKERT,
*Assistant Examiners.*